(12) United States Patent
Sanders et al.

(10) Patent No.: US 11,362,558 B2
(45) Date of Patent: Jun. 14, 2022

(54) STACKED LAMINATION ROTOR

(71) Applicant: Amber Kinetics, Inc., Union City, CA (US)

(72) Inventors: Seth R. Sanders, Berkeley, CA (US); Kyle B. Gaiser, Union City, CA (US); Greg Olsen, Union City, CA (US); Mark J. Holloway, Mountain View, CA (US); Roger Nelson Hitchcock, San Leandro, CA (US); Peter Thomas Tennessen, Oakland, CA (US); Matthew K. Senesky, Berkeley, CA (US); Edward Young Chiao, San Jose, CA (US); Darlene W. Conolly, Union City, CA (US); Keenan William Rodewald, Union City, CA (US)

(73) Assignee: AMBER KINETICS, INC., Union City, CA (US)

( * ) Notice: Subject to any disclaimer, the term of this patent is extended or adjusted under 35 U.S.C. 154(b) by 203 days.

(21) Appl. No.: 16/787,017

(22) Filed: Feb. 11, 2020

(65) Prior Publication Data

US 2020/0259379 A1      Aug. 13, 2020

Related U.S. Application Data

(60) Provisional application No. 62/803,892, filed on Feb. 11, 2019.

(51) Int. Cl.
| | |
|---|---|
| *H02K 1/30* | (2006.01) |
| *H02K 15/16* | (2006.01) |
| *H02K 15/02* | (2006.01) |
| *H02K 7/02* | (2006.01) |

(52) U.S. Cl.
CPC ............... *H02K 1/30* (2013.01); *H02K 7/025* (2013.01); *H02K 15/02* (2013.01); *H02K 15/165* (2013.01)

(58) Field of Classification Search
CPC ............ H02K 7/00; H02K 7/006; H02K 7/02; H02K 7/025; H02K 7/04; H02K 15/00; H02K 15/02; H02K 15/16; H02K 15/165; H02K 7/003; H02K 1/30; F16F 15/00; F16F 15/30; F16F 15/31; F16F 15/315; F16F 15/3153; F16F 15/32; B60L 50/00; B60L 50/30

See application file for complete search history.

(56) References Cited

U.S. PATENT DOCUMENTS

| | | | | |
|---|---|---|---|---|
| 3,985,000 | A * | 10/1976 | Hartz | F16D 3/79 403/220 |
| 4,538,079 | A * | 8/1985 | Nakayama | H02K 7/025 310/74 |
| 6,122,993 | A * | 9/2000 | Morris | F16F 15/305 74/572.11 |

(Continued)

*Primary Examiner* — Tran N Nguyen
(74) *Attorney, Agent, or Firm* — Soquel Group LLC

(57) ABSTRACT

The invention is a flywheel rotor that includes a number of adjacent laminations, stacked one on top of another, where each of the laminations has the same shape and is rotationally symmetric around a center axis, and where the shape is substantially circular and includes a plurality of protrusions on the circumference, and each of the laminations includes at least one hole for at fastening bolts to pass through. The invention typically includes an endplate at each end of stack of laminations and one of the two endplates attaches to a stubshaft.

14 Claims, 15 Drawing Sheets

(56) References Cited

U.S. PATENT DOCUMENTS

| | | | |
|---|---|---|---|
| 7,267,028 B2* | 9/2007 | Gabrys | F16F 15/3153 |
| | | | 74/572.11 |
| 2003/0029269 A1* | 2/2003 | Gabrys | F16F 15/30 |
| | | | 74/572.11 |
| 2016/0377147 A1* | 12/2016 | Sun | F16F 15/315 |
| | | | 74/572.1 |
| 2017/0211659 A1* | 7/2017 | Golka | F16F 15/3153 |

* cited by examiner

STACKED LAMINATION ROTOR

BACKGROUND

1. Field of Art

This description generally relates to energy storage using flywheels. Specifically, it pertains to the design of flywheel rotors comprised of stacked laminations.

2. Description of the Related Art

Modern energy storage rotors applied in multi-hour utility scale applications, as well as in short duration power applications such as Uninterruptible Power Supply (UPS) settings, are commonly built either with composite fiber wound rotors, or from steel. When addressing the multi-hour discharge applications that occur in utility applications, and also in some commercial/industrial settings, optimizing rotor cost is a central objective.

The cost of a flywheel rotor may constitute in the range of 50% of the manufactured system cost. Thus, the other flywheel components constitute the other half of the system cost. And many of these system costs scale with rotor volume and/or mass. lifting, Thus, reducing rotor mass and volume is a premium concern in flywheel energy storage systems.

Monolithic steel rotors enable utilization of standard steel working processes—primary melt, secondary re-melt purification steps, forge, quench, and temper—to arrive at a desired shape and material mechanical property set within an attainable design space. In general, rotor shapes can be characterized by a "shape factor" k $$k = \frac{E}{\sigma V} \quad \text{Equation 1}$$

where E is the stored kinetic energy, V is the total rotor volume, and σ is the peak stress in the rotor. Shape factors range from 0 to 1. Roughly, the shape factor is an indicator of efficacy of rotor material utilization. High shape factor is an indicator that stresses are distributed rather uniformly over the rotor volume, thus corresponding to good material utilization. As can also be seen from the definition of shape factor, stored energy scales directly with rotor peak stress. Thus, the practically useable peak stress defines how much energy can be stored in the rotor. The maximal peak stress may be limited by a failure criteria related to material yield or ultimate stress, or may be limited by a cyclic fatigue constraint.

In general, large multi-ton monolithic solid cylindrical rotors with substantial axial thicknesses in the range of 6-20 inches have shape factors in the range of 0.55. For very thin disks, analyzed with the assumption of two-dimensional plane stress (zero axial stress), shape factor evaluates to just above 0.6 representing approximately a 10% improvement for such a thin disk relative to the monolithic rotor.

In order to manufacture a rotor with adequate energy capacity, the total volume (or mass) of the rotor needs to be dimensioned appropriately. The use of a stacked lamination construction of a rotor decouples the rotor size from the manufacturing process for the individual laminations. Lamination lateral dimensions are only limited by available supply widths of material stock, i.e. the coil width. And, the axial dimension for a stacked lamination rotor is defined by how many laminations are stacked. Thus, virtually any axial dimension of rotor can be realized. The relatively unconstrained rotor dimension that can be achieved with the stacked lamination approach contrasts with that realizable with a solid forging, that may also be used in some rotor designs.

Cold rolling is a process that typically follows a standard hot rolling process, in which previously hot rolled plate material is further reduced in thickness. The term cold rolling refers to the fact that temperatures allowed in the process are below those where scale would be formed on the metallic surface. Cold rolling is used ubiquitously across the metal production industry, with product sold in coils or sheet formats, and many possible alloys, treatments, and finish conditions offered across a large set of metals. Example materials are those used in many parts of automotive manufacturing, such as in readily formable auto body panel parts, as well as in high strength components used in bumpers and structural panels. Silicon steel materials used in the electrical industry to build transformers, motors, and generators are also cold rolled, to achieve required thicknesses, uniformity and finish.

Cold rolled steel materials for critical applications, say in automotive bumpers and structure panels, are readily available with very high tensile strengths, up to 2000 Mpa for example. Such materials are typically offered in thicknesses ranging from about 0.5 mm to 2.0 mm, by leading global suppliers. Material quality is typically excellent, with inspection readily carried out with an automated optical inspection system. Thus, defects are not typically encountered within large panels. Further, very basic carbon steel alloys can be used to achieve very high strengths, since the quenching step for such thin material permits an adequate cooling rate to readily achieve full through hardening even with low alloy steel.

As already noted, there are several cost and performance advantages to laminated steel rotors over monolithic forged steel rotors: (1) The continuous processing of cold rolled steel is more economical than the individual processing required by monolithic rotors. Basically, the ubiquitous, continuous rolling processes replaces the one-off forging step; (2) Monolithic rotor thickness is limited by the hardenability of the steel alloy that is used. For a 6-inch-thick rotor to achieve the same strength levels as a 2 mm-thick lamination, a substantially more expensive steel alloy must be used. Monolithic forgings reach a limit in maximum thickness due to hardenability limits, whereas a rotor comprised of cold rolled laminations can be stacked into an assembled rotor as thick as needed because each lamination is individually quenched and tempered; (3) Laminated steel rotors also have advantages in terms of the defects present in the steel. As noted above, the cold rolling and inspection processes produce very high quality material. Further, in a flywheel rotor, the greatest stresses are in the in-plane radial and hoop (circumferential) directions. Defects oriented perpendicular to the radial or hoop directions will form cracks and grow more quickly than defects parallel to the hoop and radial directions. The rolling process orients grain, and any defects parallel to the rolling direction, which is optimal from a fatigue crack growth perspective. Monolithic forged rotors may have defects oriented parallel with the rotor axis, which is the most vulnerable orientation for fatigue crack growth in such a structure.

Inspection of solid forgings is usually carried out by ultrasonic (UT) inspection through volume, and by magnetic particle and/or die penetrant inspection for surface inspection. Although these are standardized testing processes, the demands are substantial, since an inspection error can be catastrophic. In contrast, the inspection of cold rolled materials has been substantially more automated in production practice, with advantageous results in terms of cost of inspection and ultimate product quality.

In applications intended for many 10,000's of full swing stress cycles, each corresponding to a full deep cycle of the flywheel energy storage system, stress swing is usually practically limited by cyclic fatigue. Cyclic fatigue life is dictated by the presence (or not) of a defect, and its subsequent growth as a crack to a critical dimension which then precipitates fracture. Crack growth is a direct result of stress cycling between a given minimum and maximum level. Since cold rolled laminations have favorable arrangement of their intrinsic residual defects, laminations exhibit excellent resiliency against cyclic fatigue.

SUMMARY

The subject invention is directed toward the use of stacked laminations to manufacture a rotor used in a flywheel energy system.

In certain embodiment, a rotor shape is used that improves over a standard circular disc shape by maximizing the utilization of a flywheel enclosure by the rotor.

Embodiments of rotor shapes are described that enable laminations in a stacked lamination rotor to be advantageously joined. In certain embodiments, a circular shape that has protruding scallops, referred to as a scalloped circular shape, is disclosed. The laminations include one or more holes through which axial bolts pass for the purpose of joining and fastening the laminations. In other embodiments, an octosquare shape is used that allows through holes near each of the vertices without incurring a performance limiting stress riser.

Certain embodiments are directed to the design of endplates that bracket, at either end, a stack of laminations. Endplate embodiments include a central region and a plurality of spokes that emanate radially outward from the central region. Embodiments are directed to a variety of spoke shapes and mechanisms for fastening the spokes to the central region.

Additional embodiments are directed to a stub shaft that includes a coupling section that attaches to an endplate. In certain embodiments the coupling section includes one or more flanges that connect to an endplate and to a conical shaped central region.

Further embodiments are directed towards rotor shapes that enable rotor balance to be achieved by adding or removing rotor mass as part of a balancing procedure. One embodiment adds balancing lobes, located on the periphery of the laminations, equidistant from a set of scallop-shape protrusions used for fastening the lamination stack.

A principal embodiment is a flywheel rotor that includes a number of adjacent laminations, stacked one on top of another, where each of the laminations has the same shape and has the same orientation relative to a center axis, and where the shape is substantially circular and includes a plurality of protrusions on the circumference. The embodiment includes an endplate at each end of a stack of laminations. A stubshaft attaches to each endplate, top and bottom.

BRIEF DESCRIPTION OF DRAWINGS

Non limiting and non exhaustive embodiments of the present invention are described with reference to the following drawings. In the drawings, like reference numerals refer to like parts throughout the various figures unless otherwise specified.

Figure 1:
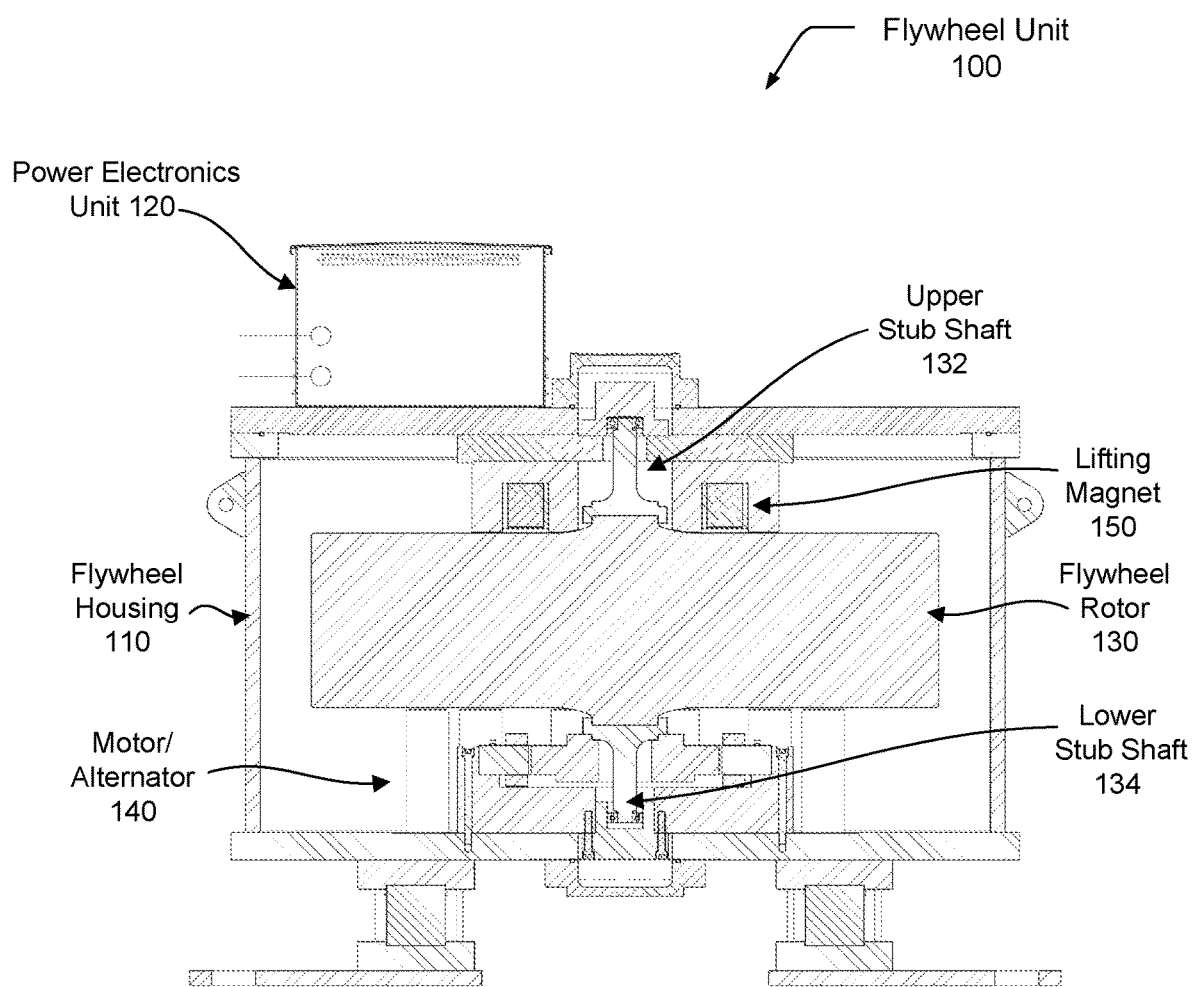
FIG. 1 is a simplified cross section view of one embodiment of a flywheel energy storage system, also referred to as a flywheel unit.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, or devices. The following detailed description is, therefore, not to be taken in a limiting sense.

Introduction

A laminated rotor is constructed by stacking many laminations where each of the laminations in the stack has the same shape and the same orientation relative a center axis. For example, a 300 mm thick rotor requires 150 laminations of 2 mm thickness, each. It is possible to design in resiliency against single point defects, by organizing the overall stack design so that in case of a single point defect, adjacent laminations can support the extra load, to avoid a catastrophic failure.

Thus, a rotor comprised of stacked steel laminations can be less costly, and can offer higher stress swing than that of a monolithic forged steel rotor. This directly translates to better performance per unit cost utilization of the rotor, and consequently, to improved utilization of the flywheel balance of system.

It may be appreciated that the shape of a stacked lamination rotor need not be circular since the laminations may be fabricated by stamping, laser cutting, or any other suitable process. Such processes may be used to create any shape; thus, any shape of lamination may be created. Thus a rotor made of stacked laminations is not restricted to a circular outline or cylindrical shape. Achieving an advantageous shape for a stacked lamination rotor and providing associated support elements is a principal objective of this invention.

Definitions

As used herein the following terms have the meanings given below:

Energy storage system—as used herein, refers to a system that stores and discharges energy. The energy storage system is typically coupled to an electric power grid, enabling the grid to store and withdraw energy as needed.

Flywheel energy storage system, flywheel unit or flywheel device, or flywheel—as used herein, is an energy storage system that stores kinetic energy in a flywheel rotor. When coupled together, one or more flywheel units form an energy storage system. A flywheel unit refers to a flywheel housing or enclosure and any rotors, motor/alternators and other elements that it houses as well as any power electronic elements, which may be housed and mounted on the flywheel enclosure.

Flywheel rotor or rotor—as used herein is a principal component of an energy storage system that is typically a rotationally symmetric mass, such as a cylinder or disc, that spins. The rotor is physically coupled, directly or indirectly, to a motor/alternator that itself is electrically coupled to a converter, such as a back-to-back inverter system, constituting an AC-AC conversion subsystem. When power is received for storage, the rotor is driven, increasing the rotational speed of the flywheel rotor. The faster a flywheel rotor spins, the more energy it stores. When power is to be extracted, the flywheel rotor drives the motor/alternator.

Lamination—as used herein refers to a thin, smooth, flat piece of material, typically steel, that is usually manufactured by a cold rolling process. While cold rolled steel is an obvious example of a material that may be used in a lamination, other types of materials inter alia plastic, aluminum, cement, glass, steel (other than cold rolled) may be used. As used herein, a lamination is cut into a shape and has two sides, a top side and a bottom side.

Stacked lamination rotor, also referred to as a lamination stack—as used herein refers to a rotor constructed as a plurality of adjacent laminations, one stacked upon the next. A stacked lamination rotor has two ends, a top end and a bottom end. Typically, the laminations have the same shape, are positioned adjacent to one another and have the same rotational orientation in relation to a center axis and are joined or held together. For example, a plurality of circular laminations would appear as a cylinder. A plurality of rectangular laminations would appear as a rectangular cuboid. While the principal application of a stacked lamination rotor as described herein is for flywheel energy storage the invention is not so limited. For example, rotors used in motors and other mechanical devices may take advantage of this invention.

Flywheel Energy Storage System

FIG. 1 is a simplified cross section view of one embodiment of a flywheel energy storage system, also referred to as a flywheel unit 100. Flywheel unit 100 includes a flywheel rotor assembly 130 or simply flywheel rotor 130, a motor and alternator 140, also referred to as motor/alternator 140 because both functions are typically performed by a single subsystem, a flywheel housing or enclosure 110, and a power electronics unit 120.

Motor/alternator 140 converts between electrical and mechanical energy, so that energy can be stored in or drawn from the flywheel 130. Motor/alternator 140 combines the function of a motor and an alternator and thus may also be referred to as motor and alternator 140. In certain embodiments, motor/alternator 140 couples to flywheel rotor 130 indirectly, through a lower stub-shaft 134 that in turn couples to a lower journal of flywheel rotor 130, and which also connects to a lower supporting bearing. An upper stub shaft 132 couples to flywheel rotor 130 to an upper bearing. In other embodiments, flywheel rotor 130 incorporates a shaft that couples to motor/alternator 140. Motor/alternator 140 couples to power electronics unit 120 via wires or other electrical couplings that typically run through a vacuum feedthrough through flywheel enclosure 110.

Flywheel unit 100 further includes a lifting magnet 150, also referred to as a magnetic unloader, that levitates, at least partially, the mass of rotor 130. Lifting magnet 150 is positioned above flywheel rotor 130.

Power electronics unit 120 has a housing that encloses and houses electrical components including a power converter for converting the input current, either dc or ac, into an alternating current acceptable to the motor/alternator 140. Power electronics unit 120 may also include sensors, processors, memory, computer storage, and network adapters as necessary to perform communications, control and status monitoring of flywheel unit 100.

Although flywheel housing 110 is shown as enclosing a single flywheel rotor 130 and a single motor/alternator 140 in other embodiments a single enclosure may enclose multiple rotors and motor/alternators.

Individual Lamination Shape

Although circular disk-shaped laminations are a natural choice for a flywheel rotor shape, offering the most conventional symmetry, other shapes are also practical and are substantially advantageous. Since cold rolled lamination material is usually supplied by a manufacturer in coil format, utilization of the lamination material can be improved with a strategic shape choice. For example, regular polygons that have at least two sides or edges that coincide with an as-supplied coil width use a higher percentage of lamination material than a conventional circle.

FIGS. 2A-2E illustrate embodiments of alternative shapes of a stacked lamination rotor. In these embodiments, the shapes are symmetric around a center axis, also referred to as rotationally symmetric. These shapes are close to circular, but have protrusions along the periphery, outer edge, or circumference of the shape. The protrusions enable through holes, intended for placement of fastening or joining bolts, to be made within the protrusions along the circumference of the lamination shape, which minimizes stresses associated with through holes. A lamination stack is bound together by a fastening mechanism. In certain embodiments, the fastening mechanism has two or more tie-rods or bolts that pass through the through holes. The fastening mechanism ensures that each lamination in the stack has the same orientation relative to a central axis when the laminations are fastened. An end-plate further secures the stack at each axial end of the stack. While the embodiments of shapes disclosed herein are all rotationally symmetric, the invention is not so limited and other shapes that are no rotationally symmetric fall within its scope.

As reference, a circle relative to a square in which it is inscribed, consumes π/4 or about a 0.785 fraction of the available material. A regular octagon which shares a portion of each edge of the supplied square, consumes about a 0.83 fraction of the available material.

Figure 2A:
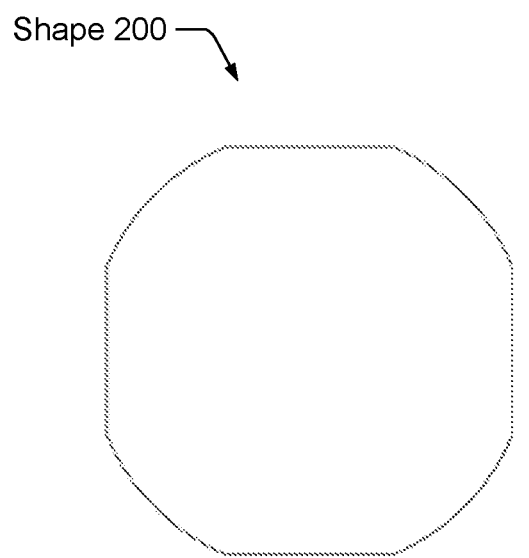
FIG. 2A illustrates a shape of a stacked lamination rotor based on an octagon that better utilizes a lamination material than an octagon.

FIG. 2A illustrates a shape 200 based on an octagon, referred to herein as an arced octagon, that better utilizes a lamination material than an octagon. The shape has circular arcs, each concentric with the common center, on four opposing sides of the octagon. The consumed area fraction is 0.84. This fraction, 0.84, is 7% larger than the largest circle that could be cut from the same square lamination area, representing 7% more available energy storage capacity.

As introduced above in Eq. 1, shape factor k is an indicator of how effectively stresses are distributed within a plate when subjected to centrifugally induced stresses. For a 2 mm thick lamination with conventional steel Poisson ratio 0.3, a circular shape with 43 inch diameter results in a shape factor of 0.61 to two digit accuracy by finite element analysis. This essentially matches the ideal plane stress analysis value for an infinitesimally thin disk, thus representing an approximate 10% improvement relative to a 10-14 inch thick monolithic rotor of the same diameter. A similar analysis on shape 200 with four circular arcs also results in shape factor of 0.61. Thus, energetic performance of the modified octagon is equal to that of a conventional circular shape, but, the modified octagon of shape 200 utilizes fractional area (and volume) of 0.84 of the square from which it is cut. It turns out that many similar non-circular shapes also exhibit essentially equivalent shape factor of approximately 0.61.

Figure 2B:
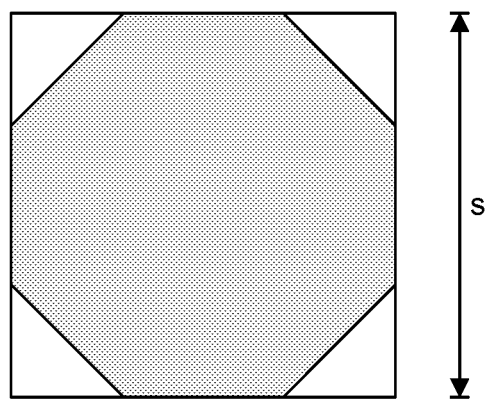
FIG. 2B illustrates the concept of a maximum length in one dimension of a stacked lamination rotor shape.

Material area utilization may be summarized with the area ratio $$\frac{A_s}{s^2},$$

where $A_s$ is the area of the lamination shape, and s is the side of the smallest square containing the shape. The idea here is that the cold rolled coil width s defines the useable square area from which a lamination shape can be cut. FIG. 2B illustrates an embodiment of a lamination shape inscribed within a square with side s. Specifically, it shows a regular octagonal lamination shape inscribed in a square with side s.

Figure 2C:
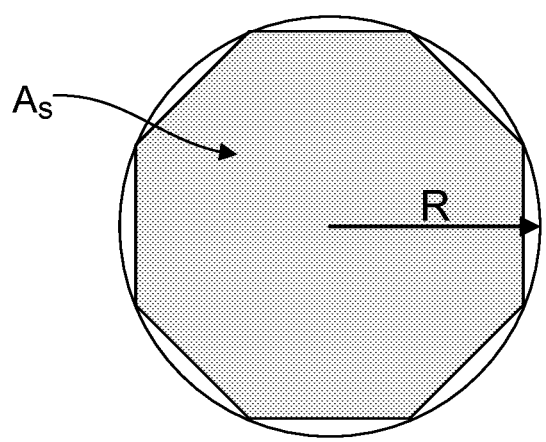
FIG. 2C illustrates the concept of utilization of a volume that is swept by a rotating rotor.

Another consideration of overall shape is how well the designed shape utilizes the available swept volume of an enclosure. FIG. 2C illustrates the concept of utilization of an enclosure volume. In this case, the radial distance from the rotation center to the nearest limiting boundary of the enclosure is R and the largest axially projected area that can be accommodated is $\pi R^2$, corresponding to a bounding circle of radius R. In view of this limitation, shapes that occupy the largest possible fraction of the bounding circle area are most efficient in their utilization of the enclosure volume. Thus, an optimization criteria is to maximize the ratio $$\frac{A_s}{\pi R^2}$$

in order to best utilize available swept area, and hence the volume of a flywheel unit enclosure.

Although lamination shape optimization design criteria represented in FIGS. 2A and 2B are not co-incident, a process for shape optimization may be followed that represents pareto-optimal trade-offs between these criteria. Thus, strategic designs may take both criteria into account, and best compromises should be chosen.

Stacked Lamination Assembly and Joining Strategy

Joining of laminations to one another, and to a stub shaft (or shaft) to provide support by a bearing impose an even more important constraint on shape design. The use of non-circular lamination shapes enables advantageous joining techniques.

Laminations may be joined together by many possible means. These include adhesive bonding, interference fit onto a central shaft as is done with many electric machine rotor assemblies, welding on the periphery by one of many possible welding processes, and retaining axial bolts. To date, all previously known joining strategies present challenges.

Adhesives exhibit strength limitations in view of axial and radial stresses encountered with large centrifugal loads due to high speed rotation, with Poisson induced axial loading associated with large in-plane tensile loading. Adhesives are also challenged by thermal limitations, and compatibility with use in a vacuum enclosure.

Welding on the periphery may be feasible, in some instances, but welding in general imposes material degradation due to the associated heat affected region of the weld. Laser welding is commonly used on small electrical steel lamination stacks, but these light weight welds are not intended as fundamental structural welds.

The use of a central shaft or axial retention bolts requires through holes, i.e. holes that pass axially through stacked laminations in a stacked lamination rotor. In general, for regions near the center of the rotor where hoop and radial stresses are nearly equal (bi-axial stress condition), the hoop stress at the required through hole is double that of either of the prevalent principal stresses. In regions away from the central region, e.g. on the periphery of a circular disk, the stress is uniaxial, in the hoop (circumferential) orientation. With uniaxial stress, a circular through-hole results in a local stress riser of triple that of the prevalent stress. Thus, through holes in circular lamination shapes are generally not practical with circular laminations.

Figure 2D:
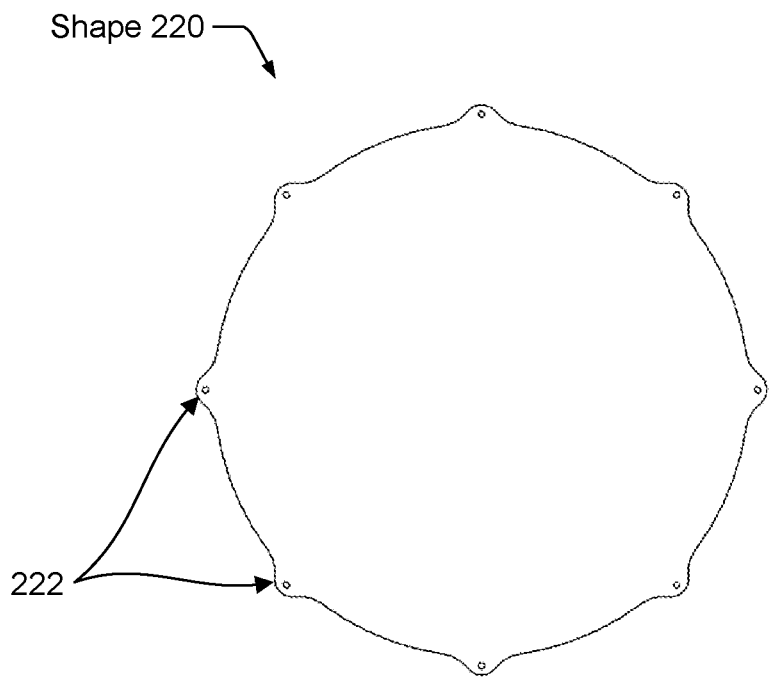
FIG. 2D gives one example of a non-circular lamination shape, referred to as a scalloped circle, which includes low stress regions near the periphery where through holes may be introduced.

However, since the lamination shape need not be circular, there are many non-circular shapes that permit low stress regions near the periphery where through-holes can be introduced, with no significant increase in stress relative to the overall prevalent stresses in the bulk of the lamination. FIG. 2D gives one example of a non-circular lamination shape 220, referred to herein as a scalloped circle, which includes low stress regions near the periphery where through holes may be introduced. Shape 220 introduces protruding "scallops" on an otherwise circular shape, that protrude a small amount beyond the otherwise circular periphery. Shape 220 has 8 uniformly spaced scallops 222 along the periphery of an otherwise circular lamination shape. Under centrifugal loading, the scallops are regions that are effectively shielded from the prevalent hoop stress, and thus remain at very low stress. It is thus readily possible to introduce one or more through holes into each scallop, without incurring a difficulty with a stress riser. This approach permits joining the laminations together, with axially oriented bolts. Further, the axial bolts may join or fasten to terminating upper and lower endplates that facilitate interconnection with a respective stubshaft at the top and bottom of the fully assembled rotor.

While the protrusions of shape 220 are equidistant and scallop-shaped, the invention is not so limited. In other embodiments the protrusions may not be equidistant and the shape of the protrusions may be other than scallop-shaped.

Figure 2E:
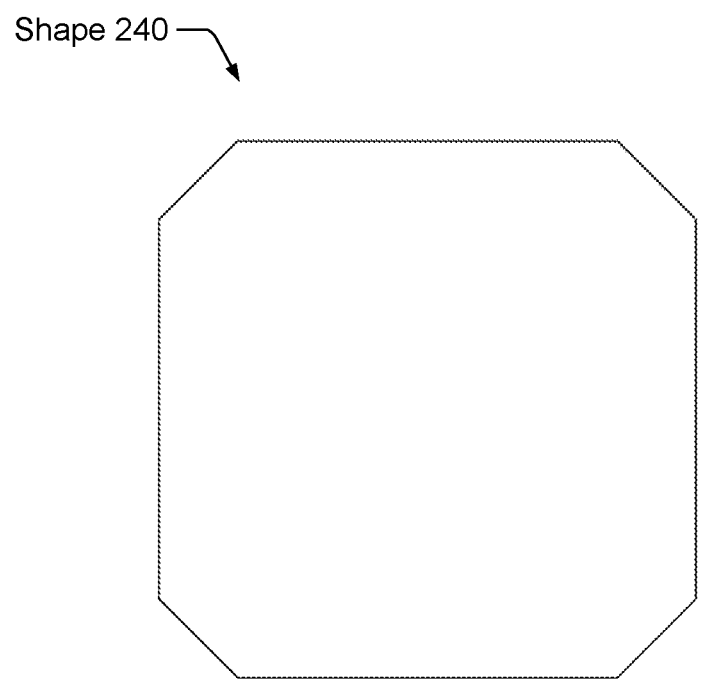
FIG. 2E illustrates a shape, referred to as an octosquare, which is an octagon obtained from a square by symmetrically truncating each of the square's four corners.

To illustrate the generality of the invention, FIG. 2E illustrates a shape 240, referred to as an octosquare, which is an octagon obtained from a square by symmetrically truncating each of the square's four corners. As determined in a finite element analysis of a 3-D model of a stack of "octosquare" laminations, with applied centrifugal loading, the vertices of the octosquare remain at much lower stress levels relative to the bulk of the volume of the shape. In the finite element analysis, von mises equivalent stress is reduced by an order of magnitude near the vertices, relative to the prevalent stress level in the central region of the rotor. Thus, the region near each of the vertices can sustain a through-hole without incurring a performance limiting stress riser.

With through-holes, it is straightforward to introduce a set of structural retaining bolts that provide three-dimensional rigidity for the assembled lamination stack. One of the challenges in such an assembly is avoiding slippage under variable load conditions, as well as across operating conditions, such as varying temperatures. Any slippage may lead to a loss of balance, and worse, may lead to dynamic instability if the slippage presents significant damping in the rotating frame. Either outcome associated with slippage is effectively a failure mode. In order to guard against slippage, the retaining through bolts should be specified to be dimensioned and tensioned to keep adequate compressive surface contact loading throughout the stack in the proximal regions of the through-holes within the scallops or vertices. Frictional consideration against slippage is used to compute the required compressive surface contact stress, and in turn, the through bolt diameter, material, and tension levels.

A convenient method to ascertain bolt tension level is to simply measure the bolt length extension as the bolt is tensioned. This provides a direct measure of the bolt strain and stress state, in contrast with the conventional use of a bolt torque specification.

Another consideration is the use of a forgiving through hole slot liner, to mitigate bolt and lamination interface wear during bolt insertion, and during operation. With cyclic application of centrifugal loading, the through bolt may (cyclically) deflect within its respective clearance hole, and come to be supported by the side wall of the clearance hole, when under centrifugal load. With cyclic centrifugal loading and unloading, this cyclic interaction with the sidewall constitutes a wear process that may produce surface wear and subsequent degradation of bolt reliability. A slot liner may be produced from a softer metal, like aluminum or brass, or an organic material. A slot liner can be fabricated as an integral tube, or a slotted tube. The latter may be fabricated by bend forming the slot liner from a sheet of aluminum stock, for example, that is in the range of 0.1-1.0 mm thick.

Joining to a Stub Shaft

In certain embodiments, for a rotating system that is restrained by two or more mechanical bearings during operation, rest, or transport, the stacked lamination rotor must be joined to a pair of stubshafts to interface with the bearings. The following discussion is focused on a single end of the rotor lamination stack, with understanding that an equivalent joining approach may be used on either end of a stacked lamination rotor.

Structural through bolts, similar to those discussed hereinabove, may be used to connect to an endplate. The term endplate, as used herein, may inter alia be a single solid part, or may be assembled from a number of components. The purpose of the endplate is to provide a structurally sufficient connection between the axial through bolts near the rotor periphery and a central stubshaft.

In certain embodiments, a solid circular endplate is used. Peak equivalent stress in a spinning disk occurs at the center. Any method used to join a cylindrical shaft or other strategically designed stub shaft to a flat plate will create a stress riser in this peak stress region. Furthermore, as discussed above in consideration of the lamination shape designs, introducing a through-hole in a circular endplate near the periphery generates a severe local stress riser. This stress riser, at center and/or periphery, limits the maximum speed and thus energy storage capacity of the rotor. The top and bottom endplates of the rotor must be shaped in a way that reduces the stress on the shaft connection, and on the connections to the structural through bolts.

In certain embodiments, a magnet-based offloading system, referred to herein as lifting magnet 150, provides a magnetic lifting force to the rotor to counteract its gravitational load that would otherwise be imposed on system bearings. To interact with lifting magnet 150, maintaining a region of a ferromagnetic top steel endplate for flywheel rotor 130 with full density and circular symmetry is desirable. Thus, use of magnetic lifting imposes one constraint on the design of the upper endplate.

Figure 3:
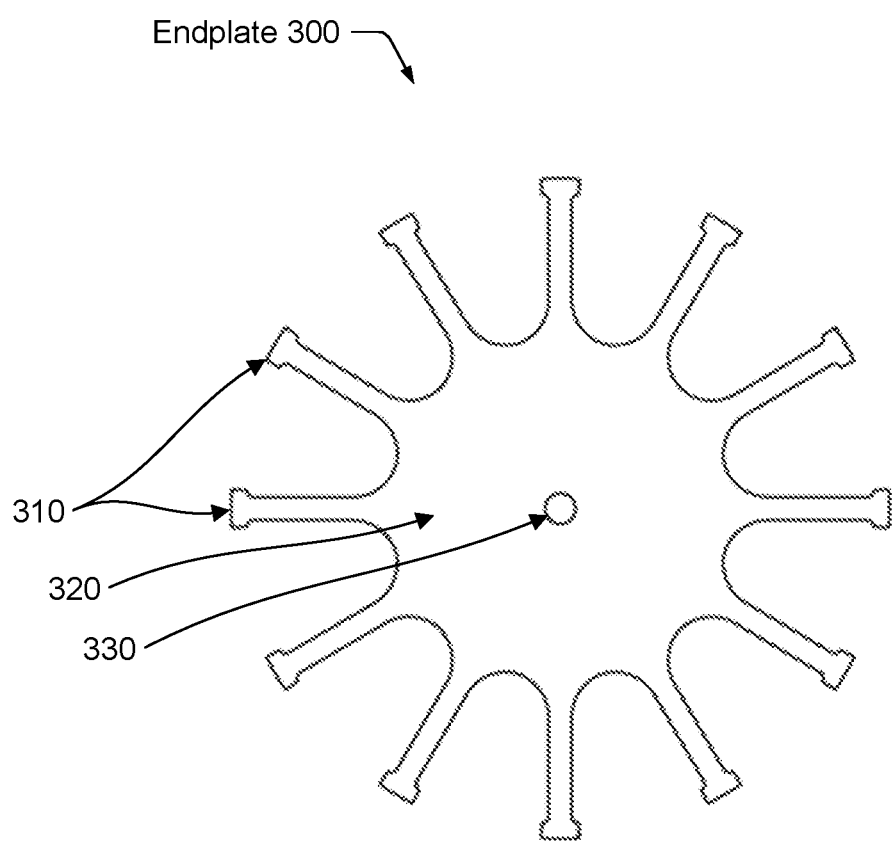
FIG. 3 illustrates one embodiment of an endplate that removes material from around an outer diameter so that the endplate has spokes.

FIG. 3 illustrates one embodiment of an endplate 300 that removes material from around an outer diameter so that the plate has spokes 310. In endplate 300, material is removed to create spokes 310 that extend radially outward from a central region 320. Central region 320 is typically made of solid steel and interacts with a lifting magnet to levitate flywheel rotor 130. The reduced mass in the periphery of endplate 300 effectively reduces stress in center region 320, allowing for attachment to lower stub shaft 134. Endplate 300 may attach to stub shaft 134 by a variety of mechanisms, including inter alia center hole 330, a bore, a bolt circle, or a weld for connection to a shaft. Any number of spokes may be used in this design. In certain embodiment, ends of spokes 310 are then connected to an adjacent lamination stack by direct connection to the previously discussed through bolts. In certain embodiments, a top endplate and a bottom endplate bracket to a lamination stack. In other embodiments, there may be only a single endplate at the top or bottom of a lamination stack. The central region of endplate 300 is typically made of solid ferromagnetic steel to interact with a lifting magnet. This constraint is only necessary for an endplate at the top of rotor 130, since lifting magnet 150 is positioned above rotor 130. Thus, in certain embodiments a central region of a lower endplate may not be made of ferromagnetic steel.

Other mechanical connections may also be used. Spokes 310 may taper outward or may be dogbone-shaped so that there is more mass at the end of the spoke than along its length. The ends of spokes 310 may be connected via a rim around the outer diameter. The added mass at the end of the spoke can then be designed so that the end of the spoke experiences radial displacement equivalent to that in the adjacent circular plate when undergoing centrifugal loading, preventing a stress riser at the spoke to through bolt joint. The length and width of spokes 310 is determined by the maximum allowable stress at the center of the plate and the area of the offloading magnet used to lift the rotor.

In certain embodiments, endplate 300 may have features beyond what is described above. For example, the endplates may be three-dimensionally shaped rather than having a flat profile. The central hub may be of any diameter, and the full endplate diameter does not necessarily need to be the same as that of the lamination stack. Fillets within endplate 300, where the spokes meet the central hub may be of any radii that sufficiently relieves the local stress riser, and mass at the end of the spokes can be any shape that adequately imparts centrifugal force in the spoke so that radial displacement is matched with the adjacent lamination stack. Spokes 310 may taper outward, increasing in mass toward the end of the spoke; or taper inward. Spokes 310 may have an additional feature at the end of the spoke to increase mass, as illustrated in FIG. 3.

Unless otherwise specified, the remarks concerning the design and structure of endplate 300 apply to other endplate embodiments described below.

Use of a monolithic solid steel endplate, i.e. made from a single piece of steel, may be suboptimal with respect to material cost, machining cost, and stress pattern. Embodiments of endplate 300, made of solid steel, require sacrifice, i.e. removal, of a substantial amount of material in manufacture, from an otherwise solid plate, either circular or rectangular. The manufacture also requires substantial machining and finishing steps. And, since the part retains integral solid steel spokes, residual centrifugal loading may still impose limiting stresses in the central region.

To work around these potential challenges endplate embodiments may have discrete spokes that fasten to a central region. As used herein, a discrete spoke attaches or fastens to a central region of an endplate via a fastening mechanism such as inter alia a bolt, a weld or a stud. In contrast, spokes 310 and central region 320 of endplate 300 are machined from a single piece of material. Exemplary material choices include inter alia aluminum, steel, titanium, and composites.

Figure 4:
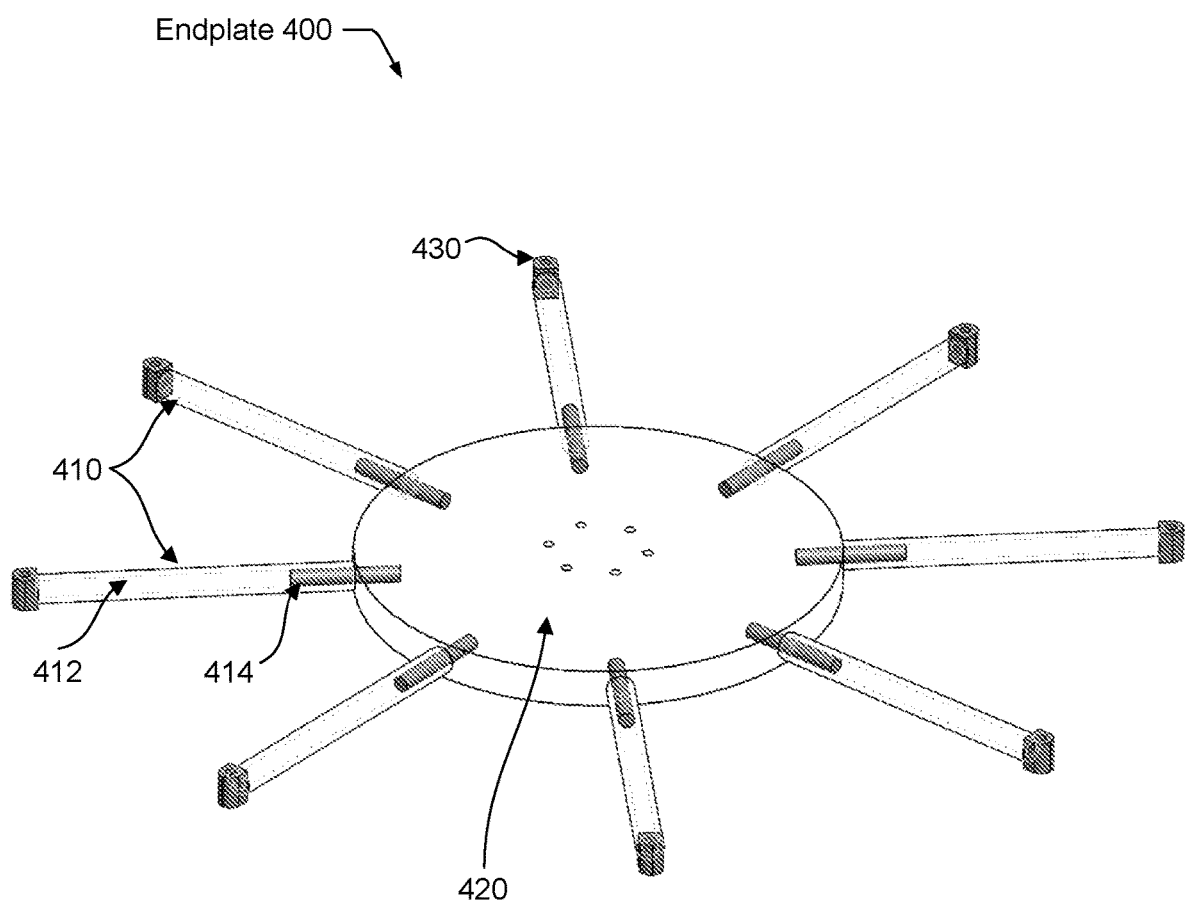
FIG. 4 illustrates an endplate that has discrete spokes that fasten to a central region.

FIG. 4 is one embodiment of an endplate 400 that has discrete spokes 410. Spoke 410 are made of substantially hollow tubes 412. Hollow tube 412 may be rectangular or circular in cross-section, and may be fabricated from any favorable material with high strength and sufficiently high strength-to-weight ratio. For example, carbon fiber composite tubes are offered commercially in many cross-sectional shapes, dimensions, wall thicknesses, and material choices, and thus constitute a rather favorable choice. The use of discrete spokes, of a certain materials of lower density than steel, e.g. carbon fiber, reduces mass since the material is lower density than steel and is hollow, but still retains tensile strength ratings similar to those of high strength steels. The reduced mass in this peripheral region, in turn, reduces centrifugal loading in the solid central region. With such a discrete spoked design, material costs are also reduced since the central plate is only of small diameter, and material drops in manufacture are minimal.

Each of spokes 410 interfaces or fastens onto a round stud 414 that protrudes from a central region 420 of endplate 400. Hollow spokes 410 may be made of many possible materials as above with reference to endplate 300. In certain embodiments, endplate 400 has a lug 430 at the outer end termination of each spoke to provide a structural interface to a respective through bolt.

Figure 5:
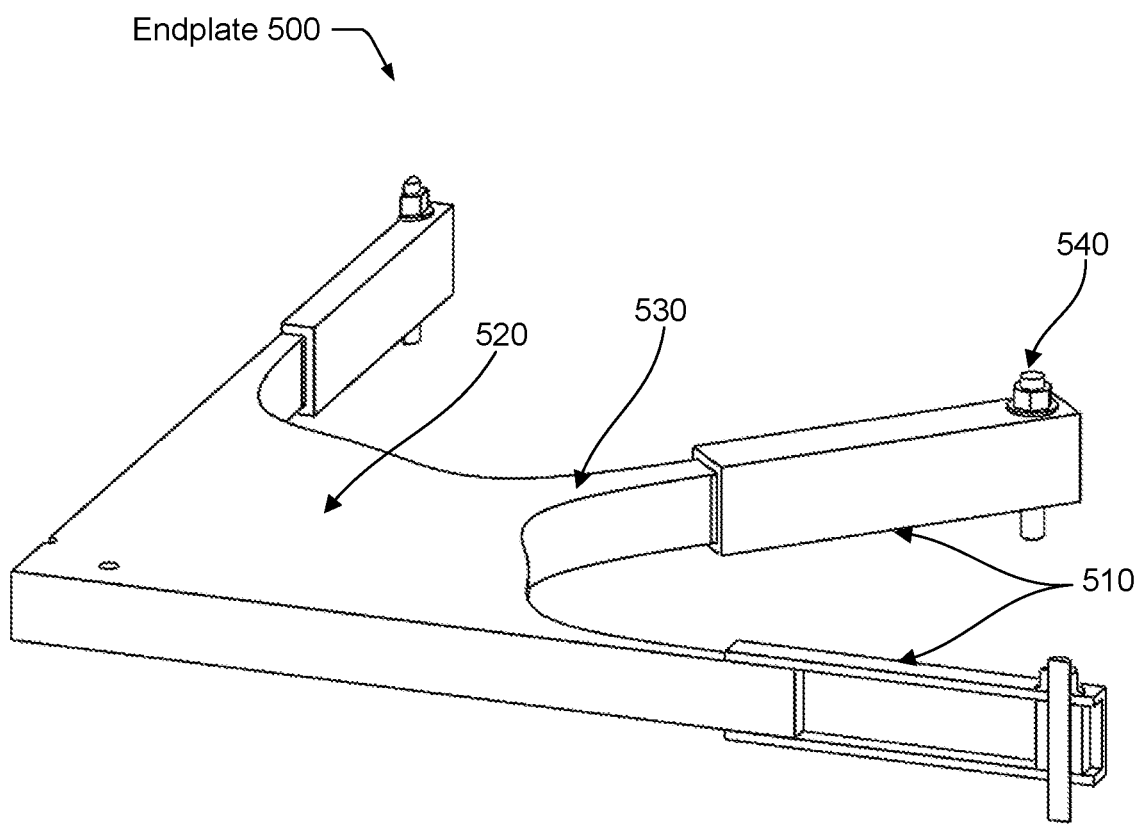
FIG. 5 illustrates a section of an endplate with rectangular cross-section spokes.

FIG. 5 illustrates a section of an endplate 500 with a plurality of discrete spokes 510 with a rectangular cross-section. Of note, spokes 510 can interface directly with protruding stubs 530 machined from a central solid steel central region 520. A through bolt 540 connects endplate 500 to laminations below. Lugs may or may not be used at the outer termination with through bolt 540.

Figure 6:
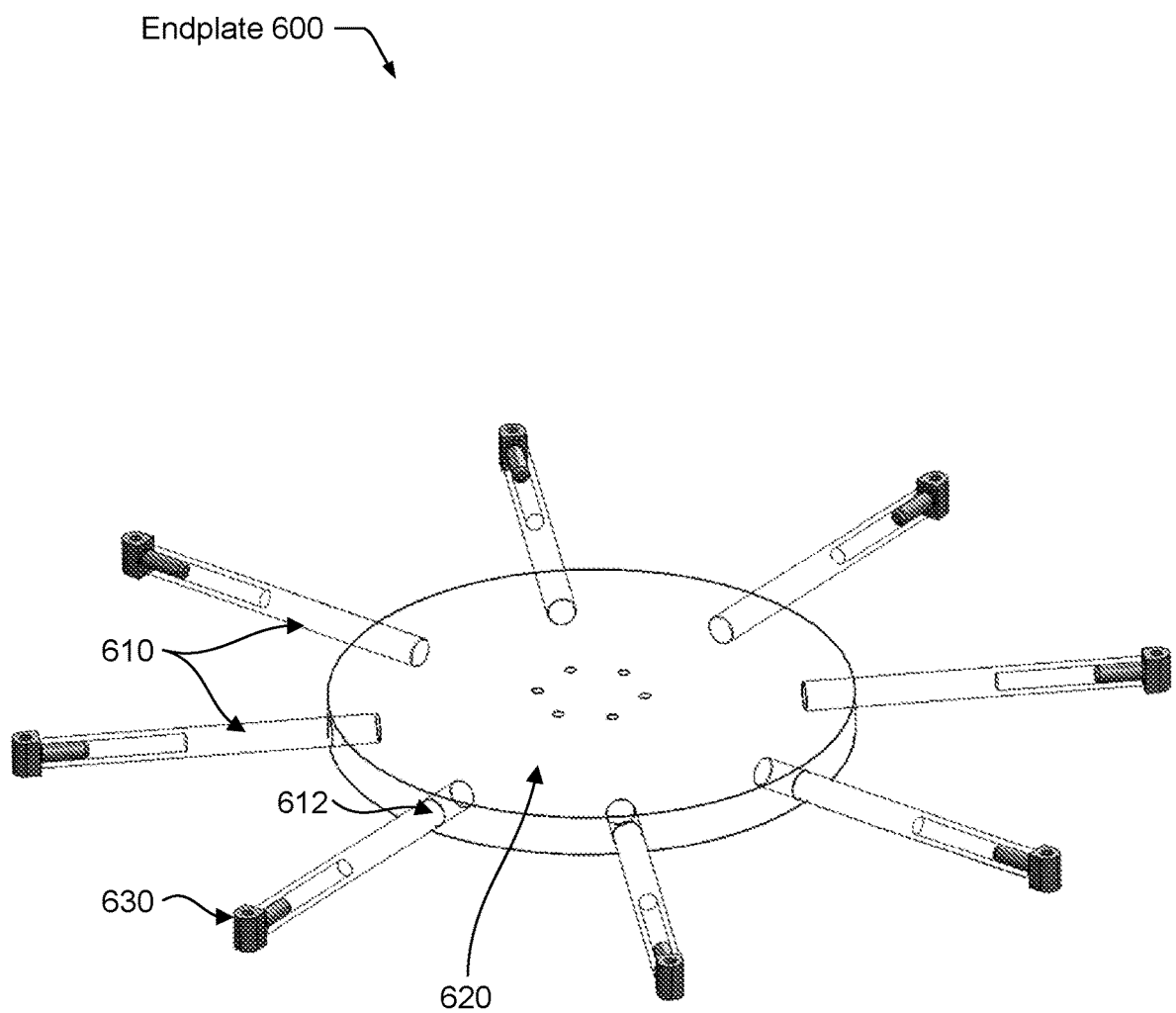
FIG. 6 illustrates another embodiment of an endplate with discrete spokes.

FIG. 6 illustrates another embodiment of an endplate 600 with spokes 610. The arrangement of endplate 600 is similar in most respects to that of endplate 400. However, in endplate 600, the spokes are machined from solid metal round bars (eg. high strength steel), and are fastened to a central region 620 of endplate 600 using a threaded or interference fit into a bore 612 in central region 620. Spokes 610 also incorporate a lug 630 at their distal end to facilitate interface with its respective structural through bolt.

Figure 7A:
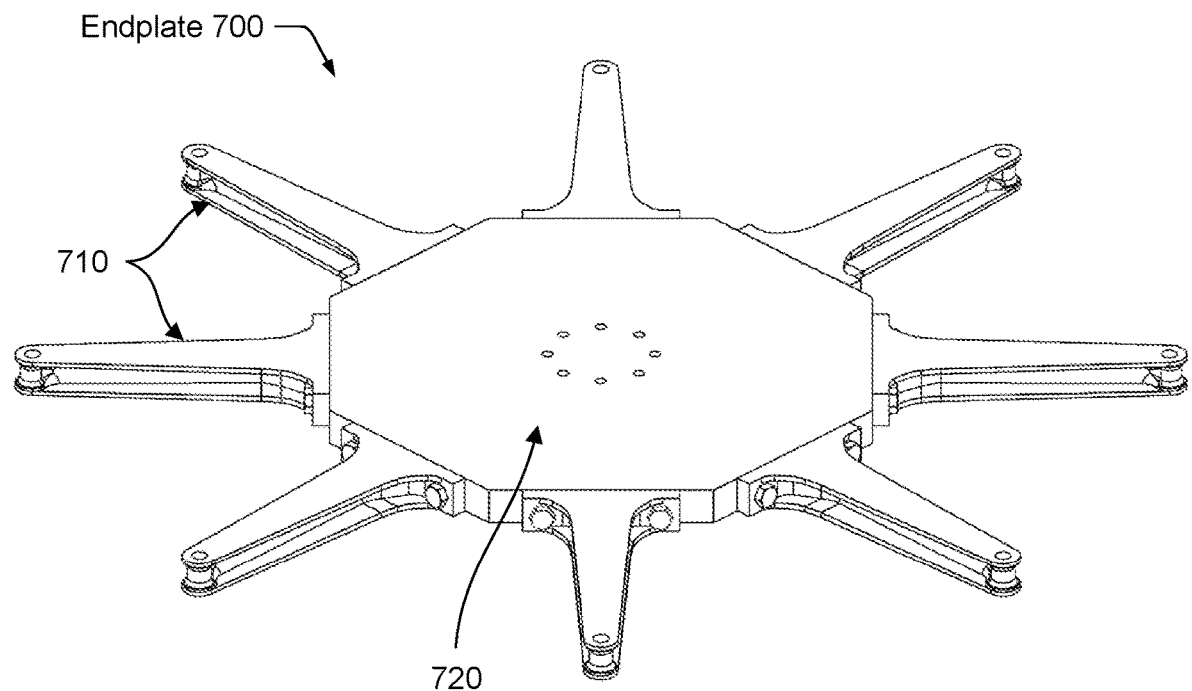
FIGS. 7A and 7B illustrate another embodiment of an endplate with discrete spokes.
Figure 7B:
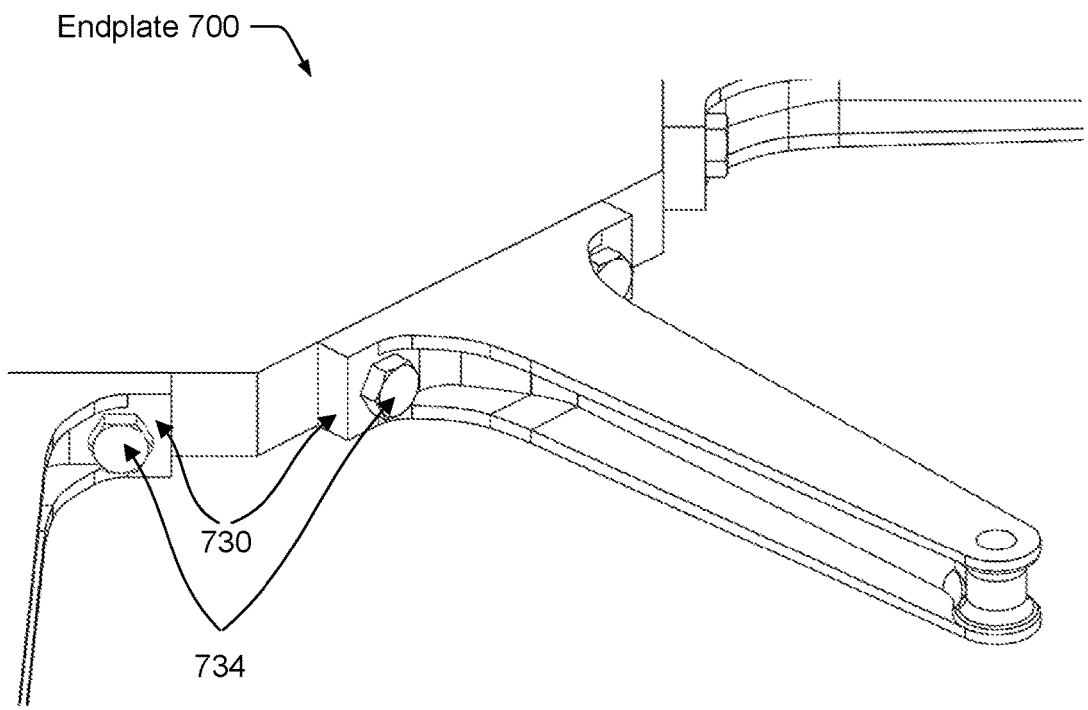

FIGS. 7A and 7B illustrate another embodiment of an endplate 700 with a plurality of spokes 710. In this embodiment, the outside diameter of a central region 720 has flat areas with pairs of radial tapped holes. A corresponding flange 730 on a proximal end of spokes 710 may then be fastened to central region 720 using conventional machine screws 734.

Figure 7C:
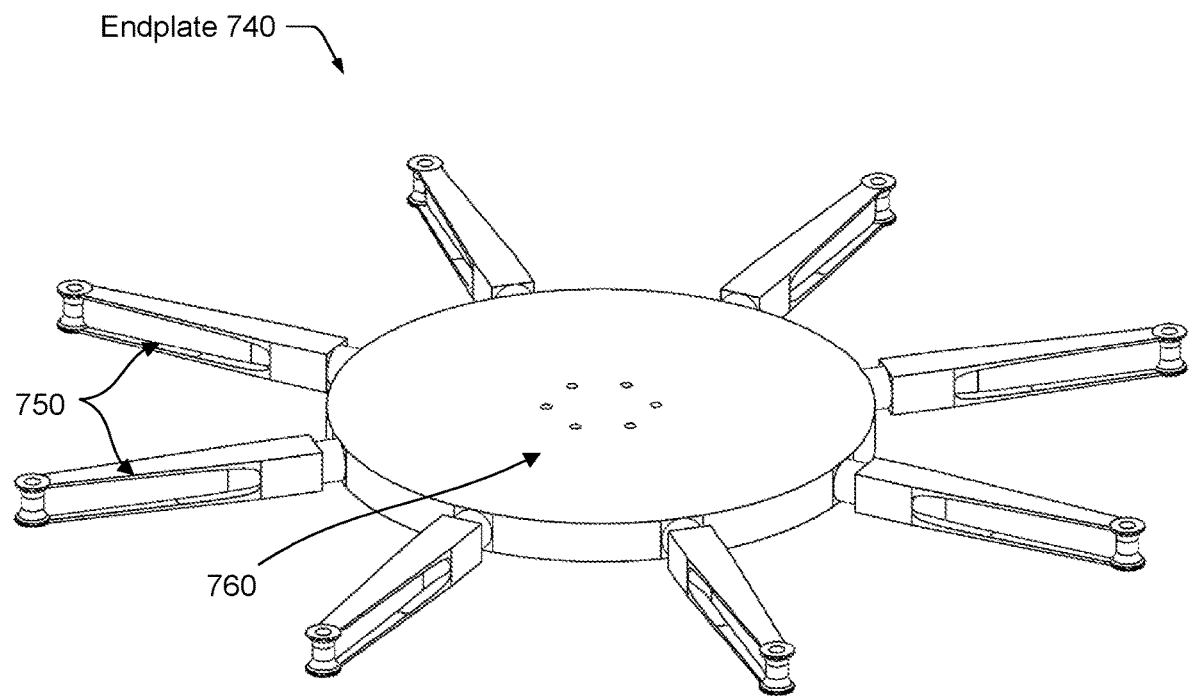
FIGS. 7C and 7D illustrate yet another embodiment of an endplate with discrete spokes.
Figure 7D:
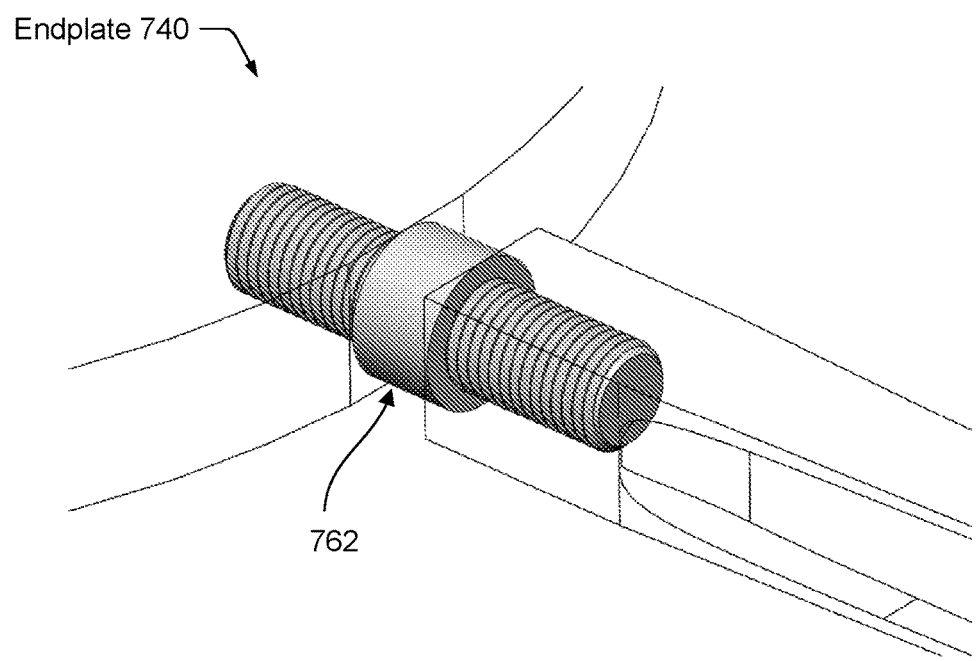

FIGS. 7C and 7D illustrate yet another embodiment of an endplate 740 with a plurality of spokes 750. In this embodiment, the outside diameter of a central region 760 has a turnbuckle attachment mechanism 762.

Figure 8A:
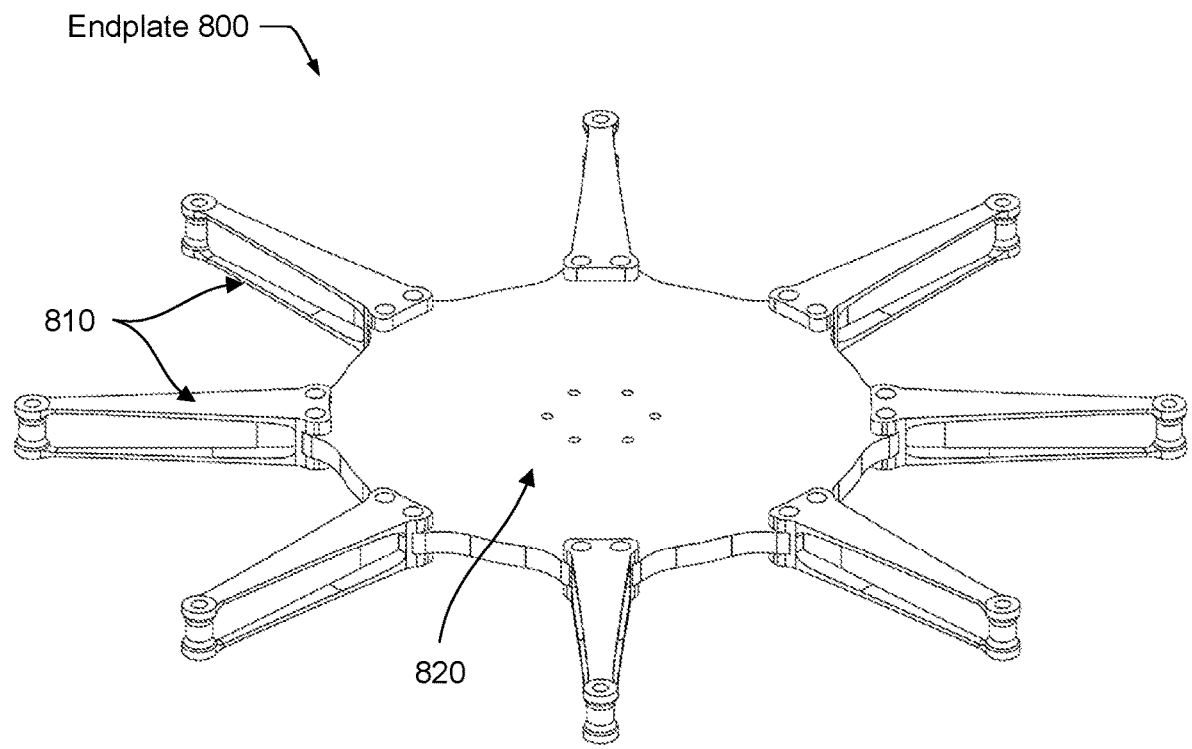
FIGS. 8A and 8B illustrate another embodiment of an endplate with discrete spokes.
Figure 8B:
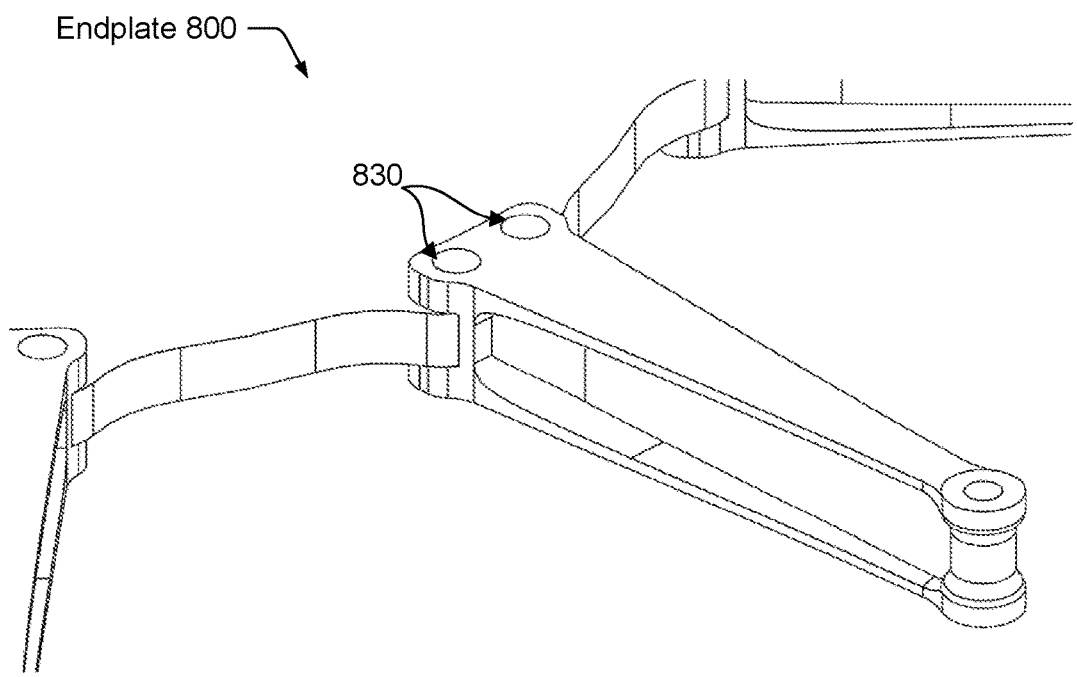

FIGS. 8A and 8B illustrate another embodiment of an endplate 800 with a plurality of spokes 810. In yet another embodiment, a central region 820 has axial holes at the perimeter which are used to connect spokes 810 via one or more shear pins 830. Endplate 800 has two axial pins 830 and two holes (not visible as they are filled with pins 830) per spoke 810. In other embodiments of endplate 800 there may be one axial pin 830 per spoke or more than two axial pins per spoke. In yet other embodiments, axial shear pins 830 may be replaced by through bolts to frictionally clamp each spoke to the central plate.

Figure 9A:
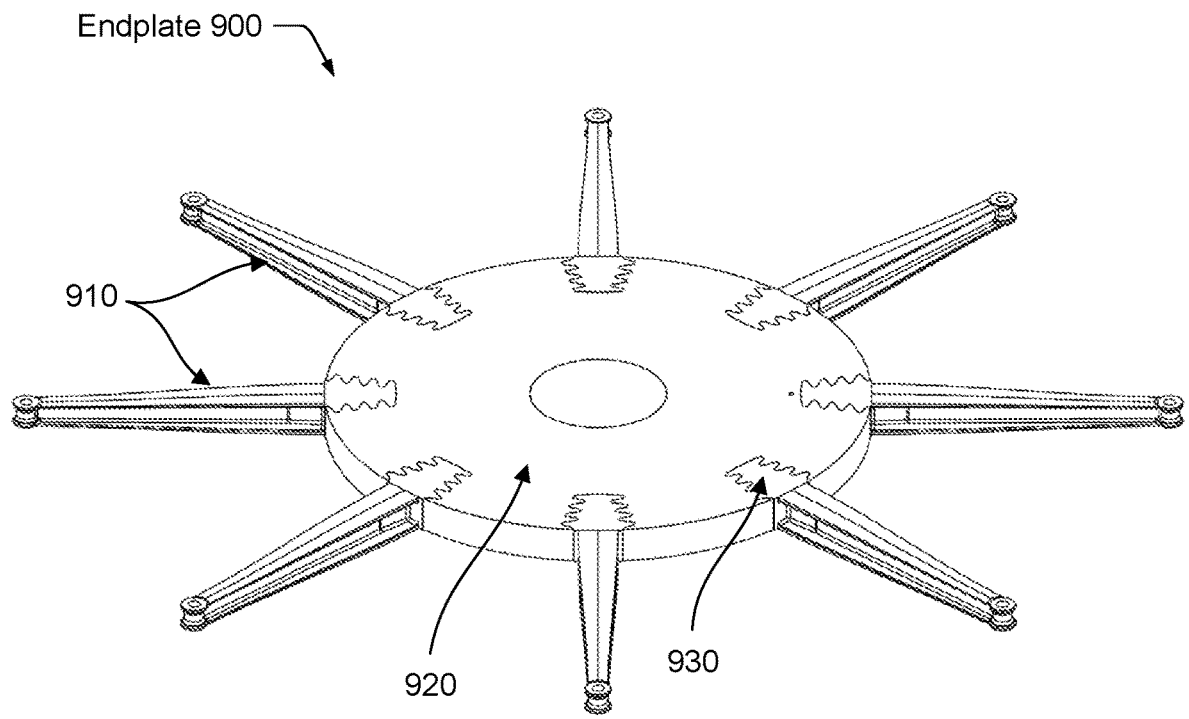
FIGS. 9A and 9B illustrate another embodiment of an endplate with discrete spokes.
Figure 9B:
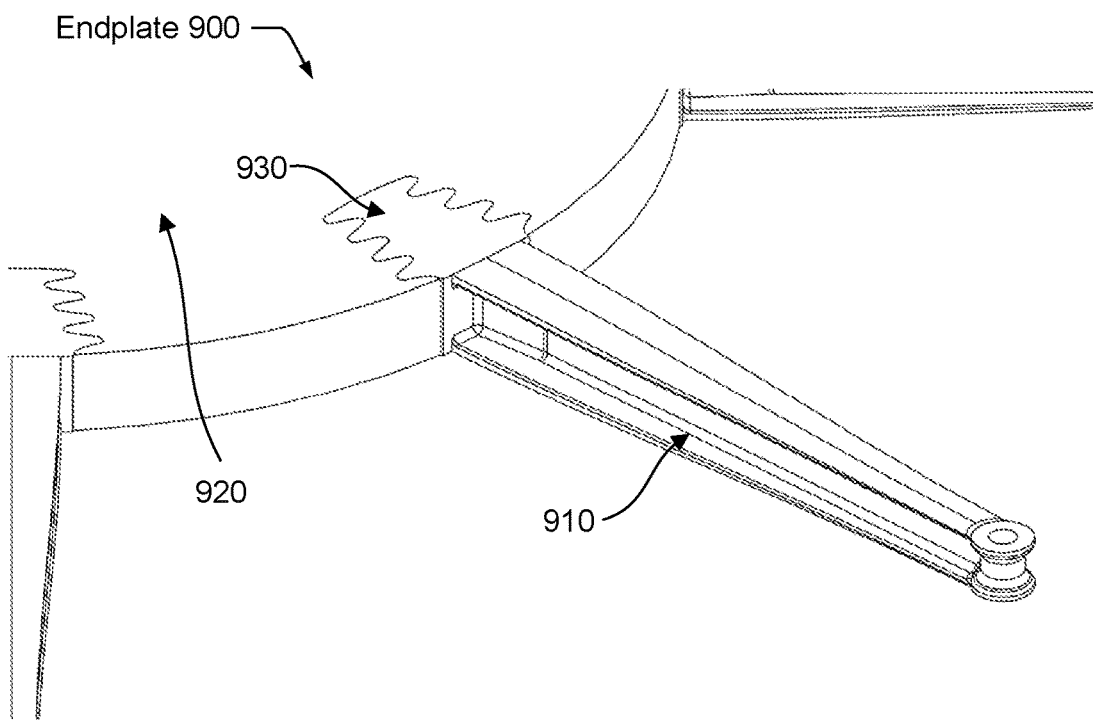

FIGS. 9A and 9B illustrate another embodiment of an endplate 900 with a plurality of spokes 910. In this embodiment, a central region 920 has a fir tree style cutout 930 that interfaces with a corresponding feature on the end of spokes 910. In other embodiments, cutout 930 can have alternative geometries, such as a bulb and root, which maintain a captive joint between the spoke 910 and the central region 920. The fir tree concept is commonly used in the aerospace industry and is durable and self-locking. Furthermore, a locking mechanism, inter alia a locking wires, a set screw, peening, a pin, or a key, may be used to keep the spoke in place after assembly.

Endplate embodiments illustrated in FIGS. 3-9 all include spokes, for reasons previously discussed. Generally, the invention encompasses endplates that are rotationally symmetric, which have a central region, and which have spokes that emanate radially outward from the central region. A variety of spoke shapes and mechanisms for fastening the spokes to the central region may be used. Further, spokes as well as the central region may be made of a variety of materials, including inter alia steel, plastic, and carbon fiber. Further, the endplate may have one or more holes in the central region to allow for bolts. Further, the distal end of the spokes may have a through hole to allow for bolts that fasten the end plate to a lamination stack.

Figure 10:
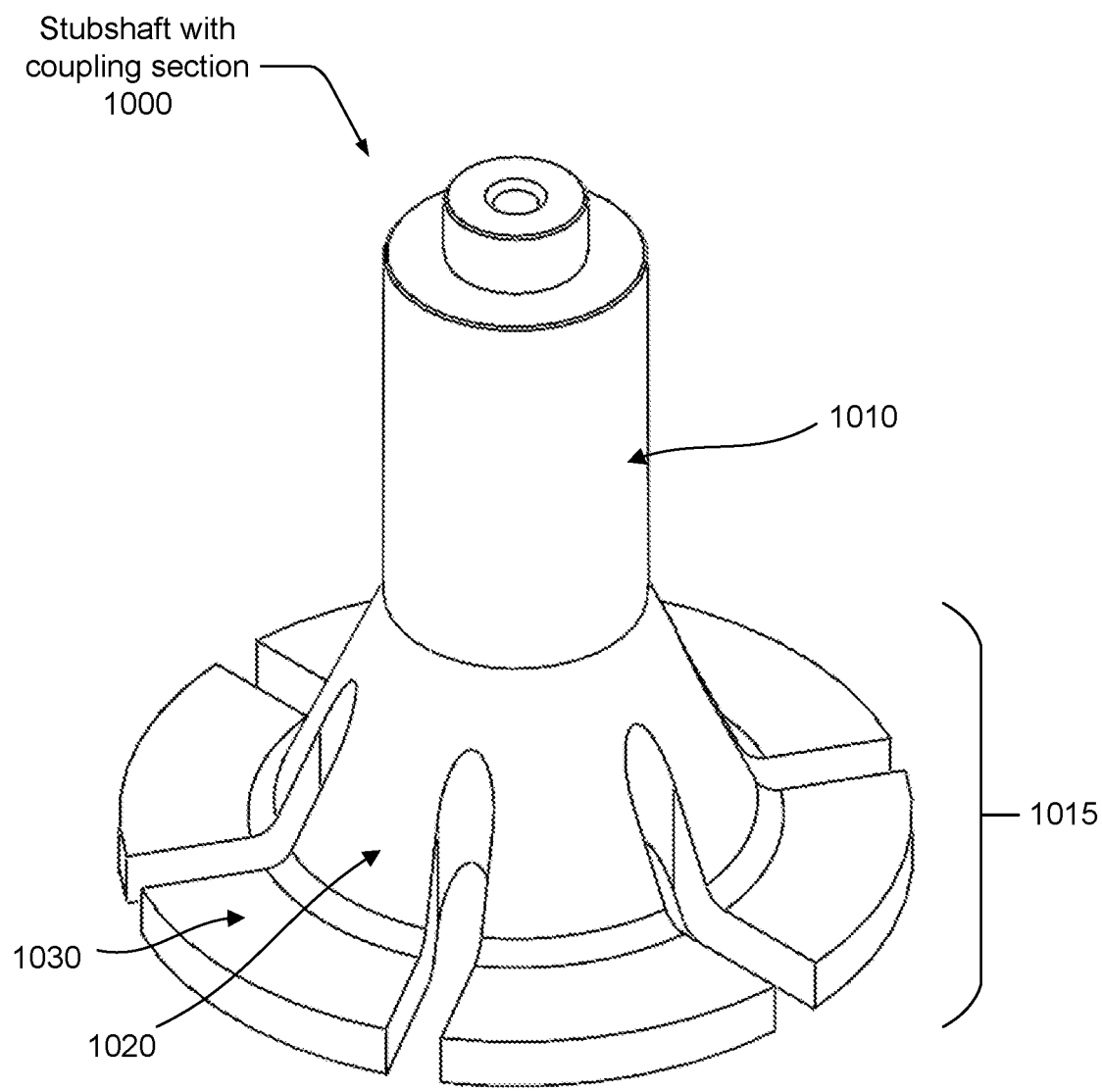
FIG. 10 illustrates one embodiment of a stub shaft that attaches to an endplate.

FIG. 10 illustrates one embodiment of a stub shaft 1000 that attaches to an endplate. Stub shaft 1000 is rotationally symmetric with flywheel 130. Stub shaft 1000 has a top, cylindrical, section 1010 and a bottom end, referred to as a coupling section 1015, which attaches to an endplate such as endplate 300, 400, 500, 600, 700, 800, 900.

Coupling section 115 includes one or more flanges 1030 and a central region 1020. Flanges 1030, at the bottom of stub shaft 1000, connect to an endplate via weld or mechanical attachment such as threaded bolts. In certain embodiments, central region 1020 is conical shaped, enabling it to flex and allowing flanges 1030 to move radially while maintaining sufficient axial stiffness. This design accommodates radial expansion and contraction by rotor 130 at the connection to an endplate.

Stub shaft 1000 may be imparted with lateral bending compliance. Such bending compliance may be used as a suspension function in flywheel unit 100 to manage resonant modes. It is often strategic to design such modal frequencies to be below the working speed range, to avoid exciting such resonances during regular operation.

Balancing

Since a stacked lamination rotor is assembled from a number of components, it is anticipated that when assembled, the rotor may exhibit a degree of both static and dynamic unbalance. Static unbalance as used herein refers to the offset of the rotor center of mass with respect to its rotation axis as defined by its bearing journals. Dynamic unbalance refers to the angle of obliqueness of the polar principle axis of moment of inertia relative to the rotation axis defined by its bearing journals. Standard balancing rigs can be used to assess and fine tune static and dynamic balance, i.e. provision of two-plane balancing.

Figure 11:
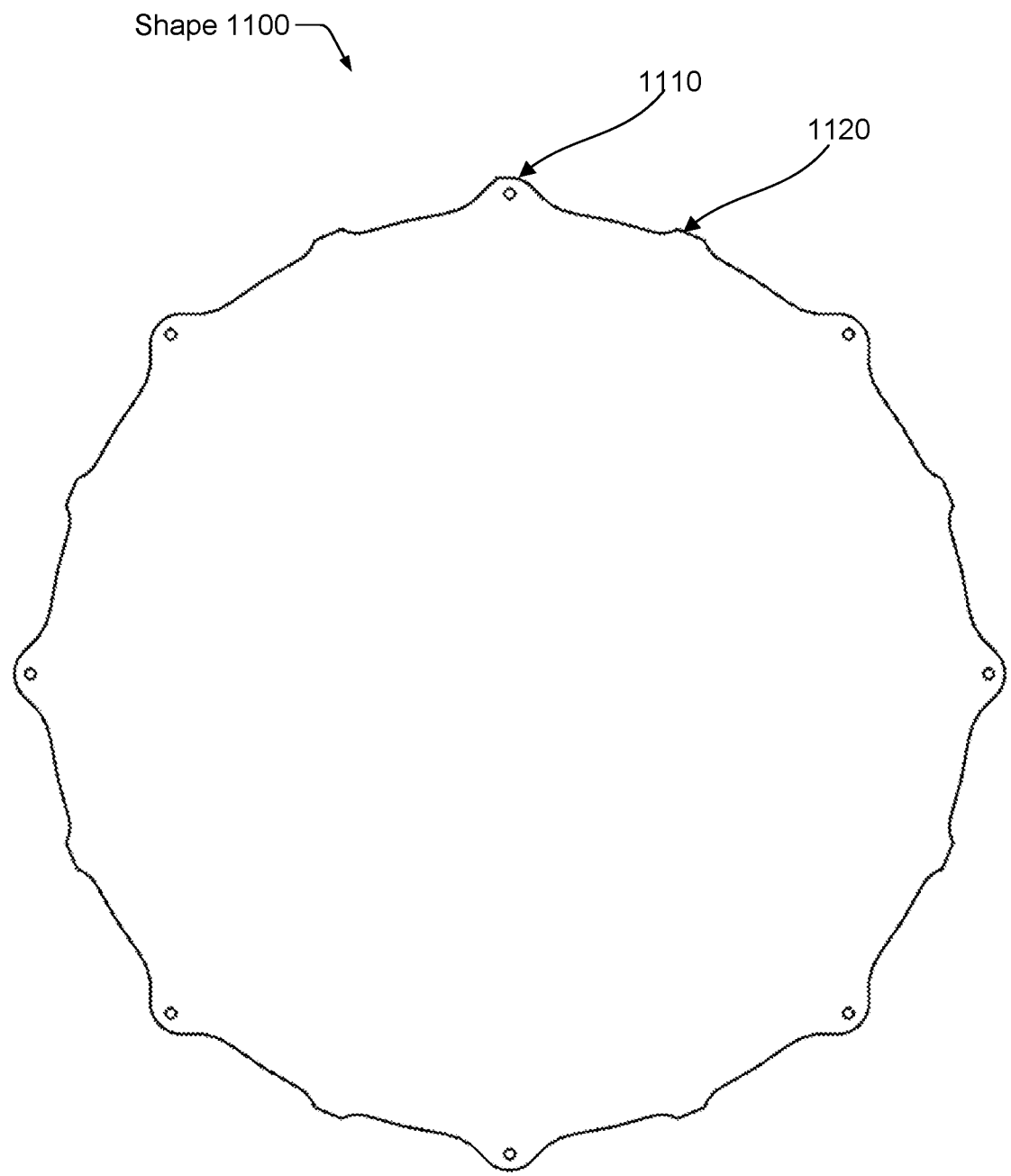
FIG. 11 illustrates a lamination shape that includes balancing lobes, each located on the periphery, equidistant from the scallop protrusions described with reference to shape with reference to FIG. 2D.

Achieving balance typically requires addition or removal of rotor mass in specific locations. For example, with a stacked lamination rotor of shape 220, it is possible to design in sacrificial material that can be incrementally ground away to adjust the rotor balance. FIG. 11 illustrates a lamination shape 1100 that includes additional balancing lobes, each located on the periphery, equidistant from the scallop protrusions described with reference to shape 220. In certain embodiments, for each scallop 1110 there is a balancing lobe 1120. Balancing lobes 1120 may be of different size than the standard scallops 1110, as shown in shape 1100. Balancing lobes 1120 are located in regions of low stress, and so play no important structural role in the rotor system. When the rotor is installed on a balancing rig, lobes 1120 can be ground to adjust for and achieve proper balance.

Figure 12:
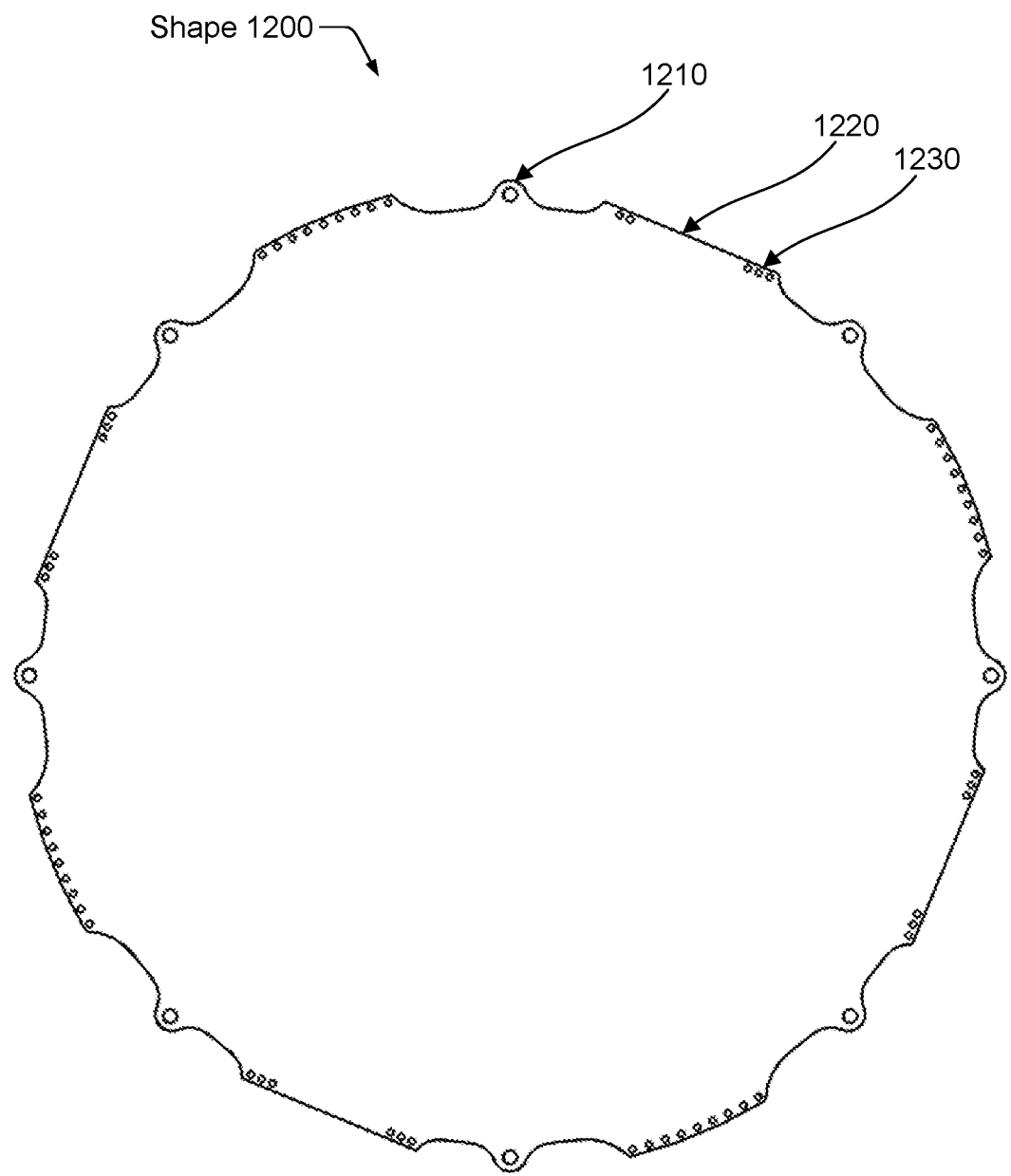
FIG. 12 illustrates another embodiment of low-stress tabs on a rotor lamination.

Mass may also be added to the rotor's laminations or to the end plate and stub shaft assembly, in order to correct for dynamic or static unbalance. FIG. 12 illustrates another embodiment of low-stress tabs 1220 on a rotor lamination. Tabs 1220 are larger than the comparable tabs in shape 1100; further tabs 1220 include holes 1230. When the rotor laminations are stacked, holes 1230 are through holes and material of varying densities can be added to these holes, either through the entire rotor thickness or partially, depending on the balancing correction required. This concept can also be applied to the endplates.

Shape 1200 has four flat sided tabs and four arced sided tabs, which optimizes the material utilization and volumetric sweep, for a given square sheet. It has an area fraction of 0.81 and a swept volumetric fraction of 0.95.

In other embodiments, these same balancing lobes may be used as locations for adding mass, for instance via threaded hardware or press fit pins of known mass increments. Compared to removal of mass, adding mass has the benefit of being easily reversible for fine tuning of balance adjustments. It also gives more predictable results than grinding.

Many other possible analogous arrangements are possible to realize such sacrificial balancing lobes or masses on the periphery. For example, in the case of polygon shape, each of the vertices is typically a local region of low stress. Thus, each vertex may be used for either a through hole, or as a balancing lobe.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A flywheel rotor, comprising:
a plurality of adjacent laminations, stacked one on top of another, wherein each lamination has an identical shape with a center axis, and wherein each lamination includes a plurality of protrusions, and wherein at least one of the protrusions includes a through hole;
two endplates, one at each axial end of the stack of laminations, wherein each endplate has a central region and a plurality of spokes, each spoke emanating radially outward from the central region; and
at least one bolt that passes through the at least one through hole in each of the laminations and fastens to a spoke of each endplate.

2. The flywheel rotor of claim 1 wherein there is no through hole through the axial center of the laminations.

3. The flywheel rotor of claim 1 wherein the laminations are made of a material selected from the group consisting of steel, plastic, carbon fiber, composite, and cement.

4. The flywheel rotor of claim 1 wherein the shape of the laminations is selected from the group consisting of an arced octagon, a scalloped circle, and an octosquare.

5. The flywheel rotor of claim 1 wherein the central region of at least one of the endplates is made of solid steel.

6. The flywheel rotor of claim 1 wherein each spoke attaches to the central region via a fastening mechanism.

7. The flywheel rotor of claim 6 wherein the fastening mechanism is selected from the group consisting of a bolt, a stud, and a weld.

8. The flywheel rotor of claim 1 wherein the spokes are cylindrically shaped tubes.

9. The flywheel rotor of claim 8 wherein the tubes are substantially hollow.

10. The flywheel of rotor of claim 1 wherein each spoke has an outer end termination with a hole to receive a respective through bolt.

11. The flywheel rotor of claim 1, further comprising:
a stub shaft attached to and rotationally symmetric with the rotor, wherein a top surface of one of the two endplates fastens to the stub shaft.

12. The flywheel rotor of claim 11, wherein the stubshaft has a top cylindrical section and a bottom, coupling, section that fastens to the endplate.

13. The flywheel rotor of claim 12, wherein the coupling section has a center section and one or more flanges that attach to the endplate.

14. The flywheel rotor of claim 1, wherein the identical shape has a plurality of lobes, wherein each lobe protrudes from the circumference of the lamination, and wherein during a balancing phase the mass of at least one lobe is reduced to achieve rotor balance.

\* \* \* \* \*